United States Patent
Wang et al.

(10) Patent No.: US 12,537,017 B2
(45) Date of Patent: Jan. 27, 2026

(54) COMPUTERIZED SCORING METHOD OF FEATURE EXTRACTION-BASED FOR COVERTNESS OF IMITATED MARINE MAMMAL SOUND SIGNAL

(71) Applicant: Qingdao University of Science and Technology, Qingdao (CN)

(72) Inventors: Jingjing Wang, Qingdao (CN); Shuai Jiang, Qingdao (CN); Meng Wang, Qingdao (CN); Runqi Cao, Qingdao (CN); Yufang Li, Qingdao (CN); Jiaming Jiang, Qingdao (CN); Xinghai Yang, Qingdao (CN)

(73) Assignee: Qingdao University of Science and Technology, Qingdao (CN)

( * ) Notice: Subject to any disclaimer, the term of this patent is extended or adjusted under 35 U.S.C. 154(b) by 0 days.

(21) Appl. No.: 18/932,524

(22) Filed: Oct. 30, 2024

(65) Prior Publication Data
US 2025/0054510 A1 Feb. 13, 2025

(30) Foreign Application Priority Data
Nov. 3, 2023 (CN) .......................... 202311454525.8

(51) Int. Cl.
*G10L 25/60* (2013.01)
*G10L 17/02* (2013.01)
(Continued)

(52) U.S. Cl.
CPC .............. *G10L 25/60* (2013.01); *G10L 17/02* (2013.01); *G10L 17/26* (2013.01); *G10L 25/24* (2013.01); *H04B 13/02* (2013.01)

(58) Field of Classification Search
CPC ......... G10L 25/60; G10L 17/02; G10L 17/26; G10L 25/24; H04B 13/02
(Continued)

(56) References Cited

U.S. PATENT DOCUMENTS

| 2009/0118989 A1* | 5/2009 | Padhi ..................... G01L 23/225 701/111 |
| 2013/0070079 A1 | 3/2013 | Zitterbart et al. |

(Continued)

OTHER PUBLICATIONS

A machine learning pipeline for classification of cetacean echolocation clicks in large Underwater acoustic datasets by Frasier (Year: 2021).*

(Continued)

*Primary Examiner* — Paras D Shah
*Assistant Examiner* — Fouzia Hye Solaiman

(57) ABSTRACT

The present invention relates to the technical field of bionic covert underwater acoustic communication, and specifically relates to a feature extraction-based imitated marine mammal sound signal covertness scoring method. The scoring method combines feature engineering to extract six universal features of a marine mammal sound signal from the perspective of human hearing and a signal waveform, and uses these features to obtain a second bionic signal covertness score through a weight coefficient formula. The covertness scoring method can characterize intrinsic information of the bionic signal in more detail from more perspectives of the signal to more accurately evaluate a difference between the bionic signal and a real signal, and the obtained score value can more intuitively describe the quality of the bionic signal covertness.

9 Claims, 5 Drawing Sheets

(51) Int. Cl.
  *G10L 17/26* (2013.01)
  *G10L 25/24* (2013.01)
  *H04B 13/02* (2006.01)

(58) Field of Classification Search
  USPC .......................................................... 704/236
  See application file for complete search history.

(56) References Cited

U.S. PATENT DOCUMENTS

| | | | |
|---|---|---|---|
| 2017/0142515 A1* | 5/2017 | Makris | H04R 3/005 |
| 2022/0028413 A1* | 1/2022 | Linton | A01K 29/005 |
| 2022/0036869 A1* | 2/2022 | Neuhauser | G06F 40/40 |
| 2023/0053475 A1 | 2/2023 | Page et al. | |
| 2023/0304851 A1* | 9/2023 | Yano | G01H 9/004 |
| 2023/0417939 A1* | 12/2023 | O'Hara | G10L 17/18 |

OTHER PUBLICATIONS

Marine mammal species classification using CNN and novel acoustic representation by Thomas (Year: 2019).*

* cited by examiner

| Feature name | Brief description of feature |
|---|---|
| Objective Difference Grade (ODG) | Objective difference grade is an important way to evaluate the difference before and after audio signal embedding. It is an important parameter to evaluate the imperceptibility obtained by comparing and analyzing a reference signal and a test signal by imitating the auditory system of human ear by a PEAQ algorithm. |
| Signal Watermark-energy Ratio (SWR) | Signal watermark-energy ratio is a distortion ratio between an audio signal with information embedded and an original audio signal, and can also be referred to as embedding strength. |
| Mel-cepstral Distance (DMel) | Mel-frequency cepstral coefficient is an effective sound representation based on the human auditory system, and the smaller the Mel Distance (DMel) obtained by the Mel-frequency cepstral coefficient, the smaller the difference between a bionic signal and an original signal. |
| Signal waveform similarity (ρ) | The similarity of signals in the time domain and frequency domain is measured using a normalized correlation coefficient ρ. |
| Minimum error of fundamental frequency (Ef) | Fundamental frequency is one of the four decisive parameters of marine mammal sound signal. |
| Minimum error of signal amplitude (Ea) | Signal amplitude is one of the four decisive parameters of marine mammal sound signal. |

FIG. 4

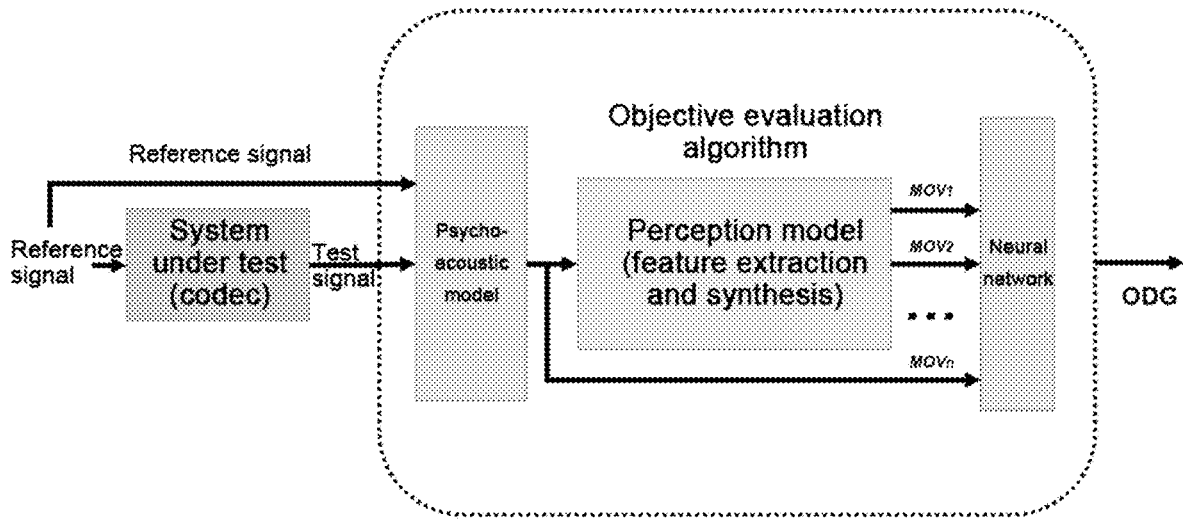

FIG. 5

| Feature name | Importance |
|---|---|
| Objective Difference Grade (ODG) | 0.247530 |
| Signal Watermark-energy Ratio (SWR) | 0.202409 |
| Mel-cepstral Distance (DMel) | 0.175072 |
| Signal waveform similarity (p) | 0.143253 |
| Minimum error of fundamental frequency (Ef) | 0.135085 |
| Minimum error of signal amplitude (Ea) | 0.096651 |

FIG. 6

| Feature name | Correlation |
|---|---|
| Objective Difference Grade (ODG) | -0.177236 |
| Signal Watermark-energy Ratio (SWR) | -0.271778 |
| Mel-cepstral Distance (DMel) | 0.055991 |
| Signal waveform similarity (p) | -0.017921 |
| Minimum error of fundamental frequency (Ef) | -0.148770 |
| Minimum error of signal amplitude (Ea) | 0.143885 |

FIG. 7

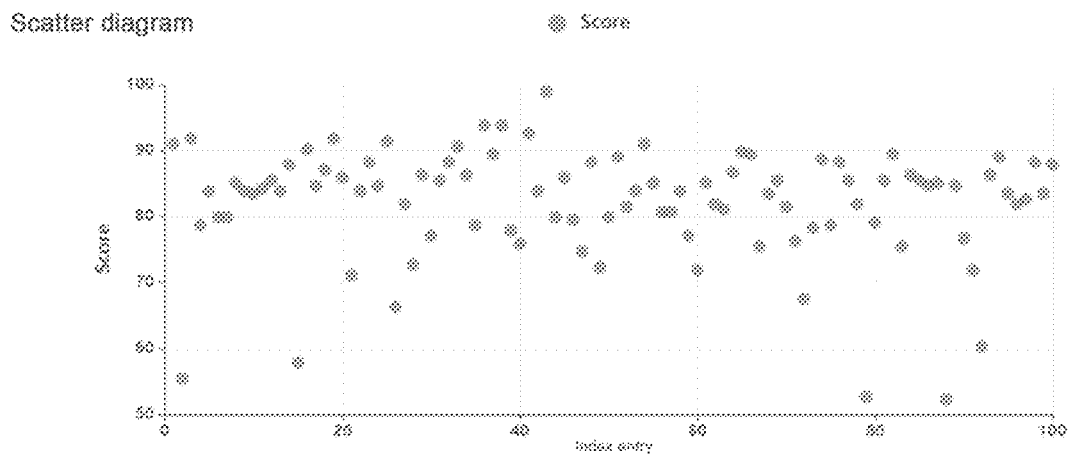

FIG. 8

ABSTRACT# COMPUTERIZED SCORING METHOD OF FEATURE EXTRACTION-BASED FOR COVERTNESS OF IMITATED MARINE MAMMAL SOUND SIGNAL

TECHNICAL FIELD

The present invention relates to the technical field of bionic covert underwater acoustic communication, and specifically relates to a computerized scoring method of feature extraction-based for covertness of imitated marine mammal sound signal.

BACKGROUND

With the development of underwater acoustic communication technology, in addition to reliability, communication speed and networking, security and covertness of underwater acoustic communication have been paid more and more attention. Traditional methods mostly use Low Probability of Detection (LPD) technology to achieve covert underwater acoustic communication. Different from traditional covert LPD communication technology, bionic covert underwater acoustic communication technology uses inherent sounds of marine organisms or artificially synthesized simulated sounds as communication signals, so that the enemy can mistakenly recognize these signals as the sounds of marine organism after detecting these signals, thus achieving the purpose of covert communication. This technology can not only ensure the security of our information transmission, but also hide a location of a corresponding underwater communication platform, and has great application prospect in the military field. Such research will make an important contribution to China's national defense security and the construction of a maritime power.

The bionic covert underwater acoustic communication technology camouflages secret signals as sounds of marine organism, thus confusing non-partners to judge received sound signals as marine biological noise and ignore the same, achieving the purpose of covert communication with the idea of camouflage. As a safe communication method, the ability to avoid being detected is very important. Therefore, covertness and bionic effect of bionic signals are very important for the bionic covert underwater acoustic communication technology. Both domestic and foreign research methods use features of only one or two signals to evaluate the covertness from an objective point of view, resulting in large errors in evaluation results. Researches on the bionic covert underwater acoustic communication technology is limited to the evaluation of performance standards such as interference immunity, communication rate and error rate, but there is no unified standard for the evaluation of its bionic effect and covertness.

However, currently studied covertness evaluation methods need to satisfy the following two principles: (1) it is difficult to distinguish original signals and bionic signals with information embedded in terms of hearing; and (2) it is difficult to distinguish the original signals and the bionic signals with the information embedded in signal form, that is, the similarity of the two signals is high in both time domain and frequency domain. As a result, the covertness evaluation methods of the existing bionic covert underwater acoustic communication technology are difficult to truly implement, and the analysis of various signals is complex. There is no unified evaluation standard, so it is impossible to accurately evaluate the difference between the bionic signals and the real signals, and it is impossible to directly obtain a score value that intuitively describes the quality of the bionic signal covertness.

SUMMARY

It is an object of the present invention to provide a computerized scoring method of feature extraction-based for covertness of imitated marine mammal sound signal, which can characterize intrinsic information of the bionic signal in more detail from more perspectives of the signal to more accurately evaluate a difference between the bionic signal and a real signal, and the obtained score value can more intuitively describe the quality of the bionic signal covertness.

In order to achieve the above object, the present invention provides the following technical solutions: the computerized scoring method of feature extraction-based for covertness of imitated marine mammal sound signal provided by the present invention includes the following steps:

S1. audio preprocessing: performing audio preprocessing on an audio data set of an input original marine mammal sound signal and an audio data set of an imitated marine mammal sound signal from the perspective of human hearing and a signal waveform to obtain preprocessed audio data sets;

S2. feature screening for universal audio features: performing feature screening on the preprocessed audio data sets of the original marine mammal sound signal and the imitated marine mammal sound signal to select universal features therein, including a first audio feature evaluated and analyzed from the perspective of human hearing and a second audio feature evaluated and analyzed from the perspective of signal processing; the first audio feature includes an Objective Difference Grade (ODG), a Signal Watermark-energy Ratio (SWR) and a Mel-cepstral Distance (DMel), and the second audio feature includes a signal waveform similarity ($\rho$), a minimum error of a fundamental frequency (Ef) and a minimum error of a signal amplitude (Ea);

S3. extracting screened six marine mammal sound audio signal features through calculation, specifically including:

S3.1. designing and implementing an extraction algorithm of an ODG of a feature 1;

S3.2. designing and implementing an extraction algorithm of a SWR of a feature 2;

S3.3. designing and implementing an extraction algorithm of a signal waveform similarity ($\rho$) of a feature 3;

S3.4. designing and implementing an extraction algorithm of a DMel of a feature 4; and S3.5. designing and implementing an extraction algorithm of the minimum error of the fundamental frequency (Ef) of a feature 5 and the minimum error of the signal amplitude (Ea) of a feature 6;

S4. feature data normalization: performing normalization processing on the extracted six audio signal features of the universal features to obtain normalized audio features;

S5. calculating importance and correlation of the audio signal features: calculating feature importance of the obtained six audio signal features through a random forest, and calculating feature correlation of the obtained six audio signal features using a Pearson correlation coefficient;

S6. obtaining weight coefficient formulas of the six audio features: finally, establishing a prediction model using linear regression and ridge regression to obtain the weight coefficient formulas of the six audio features; and S7. calculating a covertness score of the imitated marine mammal sound signal through the weight coefficient formulas of the features obtained by S6.

Preferably, a specific method of the audio preprocessing in step S1 is as follows: performing noise reduction, sound enhancement, echo cancellation and de-clicking operations on the audio data set of the original marine mammal sound and the audio data set of the imitated marine mammal sound, and then the audio signals are digitally processed to improve quality, accuracy and applicability of the audio signals.

Preferably, in step S2, the feature screening is performed by calculating Principal Component Analysis (PCA) linear correlation and cross-correlation degree between the selected features, and for each pair of features with a correlation coefficient greater than 2, one of the features is deleted, and the specific method is as follows:

S2.1. designing and implementing PCA correlation analysis to calculate the linear correlation between the features, and a PCA formula for calculating the correlation between two features is:

$$\text{cov}(x, y) = \frac{1}{m-1} \sum_{i=1}^{m} (x_i - \bar{x})(y_i - \bar{y}),$$

where x and y respectively represent different features, $\bar{x}$ is a mean of a feature x, $\bar{y}$ is a mean of a feature y, and m represents the number of feature samples;

S2.2. designing and implementing mutual information correlation analysis to calculate a non-linear correlation between the features, and for two discrete random variables X and Y, a calculation formula of mutual information MI (X, Y) is:

$$MI(X, Y) = \sum_{x \in X} \sum_{y \in Y} p(x, y) \log \frac{p(x, y)}{p(x) \cdot p(y)},$$

where p (x, y) is a joint probability distribution, and p(x) and p(y) are respective marginal probability distributions; and S2.3. carrying out feature selection, mainly selecting the universal features of various marine mammal sound signals rather than strong correlation features specific to a certain type of marine mammal sound signals, and deleting one of each pair of features with the correlation coefficient greater than 2 according to the calculated PCA linear correlation and the mutual information non-linear correlation, and finally obtaining six features: first audio feature data and second audio feature data, the first audio feature data includes the ODG, the SWR and the DMel, and the second audio feature data includes the signal waveform similarity (ρ), the minimum error of the fundamental frequency (Ef) and the minimum error of the signal amplitude (Ea).

Preferably, step S3.1 is specifically as follows:

Performing an ODG test on the sound signal embedded with hidden information to obtain the objective difference grade of the sound signal; the software takes the original sound signal as a reference signal and the bionic signal with the hidden information as a test signal, and the two signals enter a psychoacoustic model simultaneously for calculation, results are subject to feature extraction and synthesis by a perception model to obtain a series of output parameters Model Output Variable (MOV), and finally, the parameters are mapped as an ODG output by a neural network; when the ODG value is greater than 0 or less than 0, the larger the absolute value, the smaller the difference between the original signal and the bionic signal with the hidden information, the better the imperceptibility and the better the covertness of the bionic signal.

Preferably, step S3.2 is specifically as follows:

the hidden information embedded in the sound signal is regarded as noise, and a numerical value thereof is taken as a degree of influence on the original sound signal, that is, the Signal Watermark-energy Ratio (SWR); the larger the SWR value, the smaller the distortion, and the lower the embedding strength, which indicates that the bionic signal has better covertness, and a calculation formula of the signal watermark-energy ratio is:

$$SWR = 10 \cdot \log_{10} \left( \frac{\sum_{n=0}^{L-1} x^2(n)}{\sum_{n=0}^{L-1} (y(n) - x(n))^2} \right);$$

where x(n) represents the original sound signal, y(n) represents the sound signal with the hidden information embedded, L represents a length of the sound signal, and the SWR is in dB.

Preferably, step S3.3 is specifically as follows:

the signal waveform similarity refers to the difficulty in distinguishing the original signal from the bionic signal with the embedded information in the signal form, that is, the similarity of the two signals in time domain and frequency domain is high, and the similarity of the signals in the time domain and the frequency domain is measured by a correlation coefficient ρ, and a calculation formula is:

$$\rho = \frac{\sum_n s(n) s'(n)}{\sqrt{\sum_n s(n)^2 \cdot \sum_n s'(n)^2}};$$

where s(n) represents an original sound signal segment, s'(n) represents a bionic signal segment with the information embedded, and s'(n)-s(n) is regarded as a desired signal; the closer the ρ value is to 1, the closer the bionic signal is to the original sound signal, and the better the covertness.

Preferably, step S3.4 is specifically as follows:

the Mel-frequency Cepstral Coefficient (MFCC) is an effective sound representation based on the human auditory system, and a human subjective auditory frequency formula is:

$$F_{mel} = 2595 \log_{10}\left(1 + \frac{f}{700}\right) = 1127 \ln\left(1 + \frac{f}{700}\right);$$

where Fmel is a sensory frequency in Mel, and f is an actual frequency in Hz;

a transfer function of an mth bandpass filter in the human hearing frequency range is defined as $H_m(k)$, where m is the total number of filters in a same bank in the hearing range; if each filter has a triangular filter characteristic with a center frequency $f_m$, and each filter has equal bandwidth on a Mel frequency scale, then the discrete transfer function $H_m(k)$ of each filter is defined as:

$$H_m(k) = \begin{cases} 0 & k < f_{m-1}, f_{m-1}lek \\ \dfrac{k - f_{m-1}}{f_m - f_{m-1}} & f_{m-1}lek < f_{m-1} \\ \dfrac{f_{m+1} - k}{f_{m+1} - f_m} & f_mlek < f_{m+1} \end{cases} ;$$

the center frequency $f_m$ is defined as:

$$f_m = F_{mel}^{-1}\left(F_{mel}(f_l) + m\dfrac{F_{mel}(f_h) - F_{mel}(f_l)}{M+1}\right);$$

where $f_l$ and $f_h$ are respectively a lower limit frequency and an upper limit frequency of the filter $H_m(k)$, and $F_{mel}^{-1}$ is defined as $F_{mel}^{-1}(b)=700(10^{b/2595}-1)=700(e^{b/1127}-1)$
based on the Mel filter bank, the MFCCs for 1 frame are obtained by:

$$mfcc_i(n) = \sqrt{\dfrac{2}{M}} \sum_{m=0}^{M-1} \log[S_i(m)]\cos\left[\dfrac{\pi n(2m-1)}{2M}\right];$$

where n=1, 2 ... M, $$S_i(m) = \sum_{k=0}^{N-1} |X_i(k)|^2 H_m(k)$$

is an mth Mel filter energy of an ith frame signal; in order to compare the bionic signal with the original signal, the Mel distance di of the ith frame of each sound signal is defined as:

$$d_i = \sqrt{\sum_{n=1}^{M} \left(mfcc^i_{synthetic}(n) - mfcc^i_{whistle}(n)\right)^2};$$

a mean Mel distance of all frames of each signal is defined as:

$$D_{Mel} = \dfrac{\sum_{i=1}^{k} d_i}{k};$$

where i=1, 2 ... k;
the smaller the Mel distance, the smaller the difference between the bionic signal and the original signal, and the bionic signal is more likely to be ignored as a marine mammal sound signal, that is, the better the covertness.
Preferably, step S3.5 is specifically as follows:
assuming that a time-frequency diagram of the noise-reduced sound signal is $X_m[\omega,m]$, where $\omega$ represents frequency, m represents a time period divided by a window function $w[\omega]$, and $X_m[\omega]$ represents a Fourier transform result of a mth time period; and f(m) represents a fundamental frequency of the mth time period, and an expression using a maximum value extraction method is as follows:

$$f(m) = \text{argmax}|X_m[\omega]|;$$

the fundamental frequency of each time period of the sound signal without and with the information embedded is calculated respectively, and the minimum error of the fundamental frequency of all time periods is taken, and a calculation formula is as follows:

$$\Delta v = \dfrac{\sum_{m=1}^{n} |(f_T(m) - f_L(m))|}{n};$$

where n represents the number of time periods taken, $f_T(m)$ represents the fundamental frequency of the mth time period of the original sound signal, and $f_L(m)$ represents the fundamental frequency of the mth time period of the sound signal with the information embedded;
an energy $er(m)$ of a mth data block of a rth harmonic is obtained using a short-time Fourier transform with a window length L, and a formula thereof is as follows:

$$e_r(m) = X_m[f_r(m)];$$

let amplitude of a first sampling point of each data block be ar[m1], and a formula thereof is as follows:

$$a_r[m_1] = 2\sqrt{e_r[m]}/L;$$

a value of each sampling point of the data block is obtained using an interpolation method, and finally an amplitude value $a_r[n]$ of the rth harmonic at each sampling point is obtained; and a mean amplitude error of all sampling points in each harmonic of the sound signal without and with the information embedded is calculated as follows:

$$\Delta a_r = \dfrac{\sum_{i=1}^{n} |a_r^T[i] - a_r^L[i]|}{n};$$

where $a_r^T[i]$ represents an amplitude value of an ith sampling point of the rth harmonic of the original sound signal, $a_r^L[i]$ represents the amplitude value of the ith sampling point of the rth harmonic of the sound signal with the information embedded, n represents the number of sampling points, and finally the minimum error of the signal amplitude is calculated, which is defined as the minimum error of the mean amplitude error of all harmonics, and a calculation formula thereof is as follows:

$$\Delta x = \dfrac{\sum_{r=1}^{m} \Delta a_r}{m};$$

where m represents the number of harmonics, and $\Delta a_r$ represents the mean amplitude error of the rth harmonic.

Preferably, step S4 is specifically as follows:

A mean and a standard deviation of all data of each feature are calculated, and then the data is normalized; normalization is a data preprocessing technique that subtracts the mean from each data point and then divides a result by the standard deviation to map the data to a normalized distribution with a mean of 0 and a standard deviation of 1, and a normalization formula is as follows:

normalized_data=(data−means)/stds;

step S5 is specifically as follows:

the importance of the six features obtained above is calculated through the random forest, and the obtained feature importance score is normalized in the random forest to ensure that the sum of the scores of all the features is 1;

the correlation of the six features obtained above is calculated using a Pearson correlation coefficient formula, and a calculation formula of the Pearson correlation coefficient is as follows:

$$r = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}};$$

when the correlation coefficient r>0, the feature is positively correlated with a similarity score, and when the correlation coefficient r<0, the feature is negatively correlated with the similarity score.

Preferably, step S6 is specifically as follows:

S6.1. calculating a weight coefficient formula using a linear regression method

A regression algorithm for a prediction model is established using linear regression to find a linear function suitable for the data, and a calculation formula of the weight coefficient of the linear regression is:

$\omega = (X^T X)^{-1} X^T y;$ where X is an m×n matrix, each row represents a sample, each column represents a feature, and y is an m-dimensional vector representing a target variable;

The weight coefficient formula obtained by the linear regression is as follows:

y=79.2544+0.7234*$x_1$+0.2803*$x_3$+(−3.3106)*$x_4$+ 0.6653−*$x_4$+(−10.0353)*$x_5$+7.6626*$x_6$;

S6.2. calculating a weight coefficient formula using a ridge regression method

A regression algorithm for the prediction model is established using ridge regression to find a linear function suitable for the data, and a calculation formula of the weight coefficient of the ridge regression is:

$\omega_{ridge} = (X^T X + \lambda I)^{-1} X^T y;$ where $\omega_{ridge}$ is a weight vector of the ridge regression, $\lambda$ is a regularization parameter, I is an identity matrix, and the regularization parameter $\lambda$ controls the intensity of regularization.

The weight coefficient formulas obtained by the ridge regression is as follows:

y=79.2544+0.7138*$x_1$+0.2723*$x_3$+(−3.3078)*$x_4$+ 0.6675*x+(−9.4801)*$x_5$±7.0694*$x_6$.

The present invention has the following beneficial effects:

The computerized scoring method of feature extraction-based for covertness of imitated marine mammal sound signal of the present invention extracts six universal features of multiple marine mammal sound signals from the perspective of human hearing and signal processing, and uses these features to obtain a second bionic signal covertness score through the weight coefficient formulas to more accurately evaluate the difference between the bionic signal and the real signal, and the score value can intuitively describe the quality of the bionic signal covertness.

The computerized scoring method extracts six universal features of multiple marine mammal sound signals from the perspective of human hearing and the signal processing, and uses these features to characterize intrinsic information of the bionic signal in more detail from more perspectives of the signal with high calculation accuracy and precision, thus more accurately evaluating the difference between the bionic signal and the real signal.

BRIEF DESCRIPTION OF THE DRAWINGS

FIG. 4 is a detailed description of six features of the present invention;

FIG. 5 is a flowchart of an ODG test algorithm of audio quality evaluation software of the present invention;

FIG. 6 shows importance of six features obtained in an embodiment of the present invention;

FIG. 7 shows correlation of six features obtained in an embodiment of the present invention; and FIG. 8 is a graph of distribution of audio signal score values in an embodiment of the present invention.

DESCRIPTION OF THE EMBODIMENTS

In order to make the technical means, creative features, and achieved effects of the present invention easy to understand, the technical solutions in the embodiments of the present invention will be further described clearly and completely in conjunction with the accompanying drawings. It is obvious that the embodiments described are only some, instead of all, of the embodiments of the present invention. All other embodiments obtained by those of ordinary skill in the art based on the embodiments of the present invention without creative efforts fall within the protection scope of the present invention.

Figure 1:
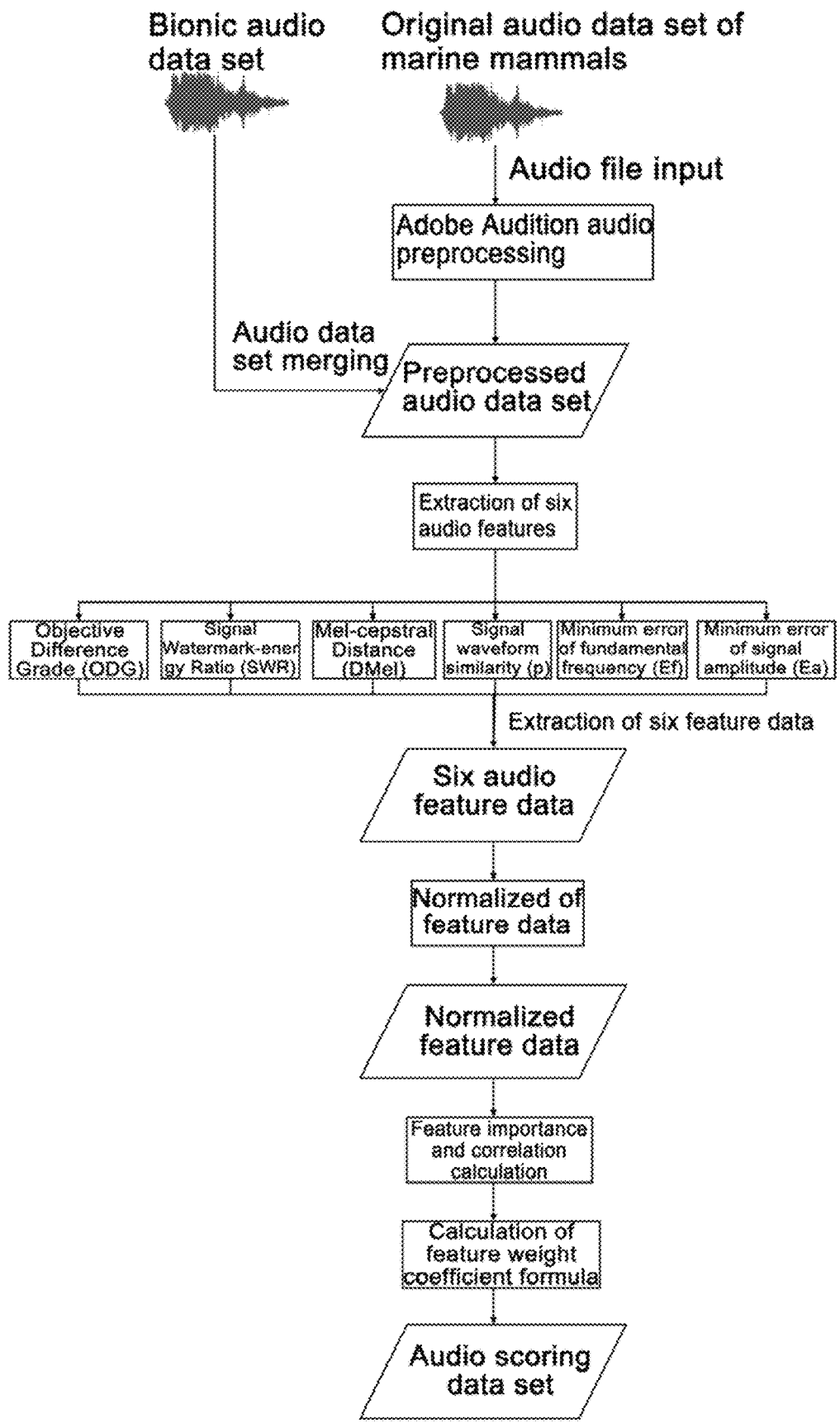
FIG. 1 is an overall flowchart of the present invention.

As shown in FIG. 1, the computerized scoring method of feature extraction-based for covertness of imitated marine mammal sound signal provided by the present invention includes the following steps:

S1. Audio preprocessing:

In the scoring method, audio preprocessing is performed on an audio data set of an input original marine mammal sound signal and an audio data set of an imitated marine mammal sound signal from the perspective of human hearing and a signal waveform to obtain preprocessed audio data sets.

A specific method of the audio preprocessing is as follows: performing noise reduction, sound enhancement, echo cancellation, de-clicking and other operations on the audio data set of the original marine mammal sound and the audio data set of the imitated marine mammal sound, and then the audio signals are digitally processed to improve quality, accuracy and applicability of the audio signals.

S2. Feature screening for universal audio features:

Feature screening is performed on the preprocessed audio data sets of the original marine mammal sound signal and the imitated marine mammal sound signal to select universal features therein, including a first audio feature evaluated and analyzed from the perspective of human hearing and a second audio feature evaluated and analyzed from the perspective of signal processing; and the first audio feature includes an ODG, a SWR and a DMel, and the second audio feature includes a signal waveform similarity (ρ), a minimum error of a fundamental frequency (Ef) and a minimum error of a signal amplitude (Ea).

Figure 2:
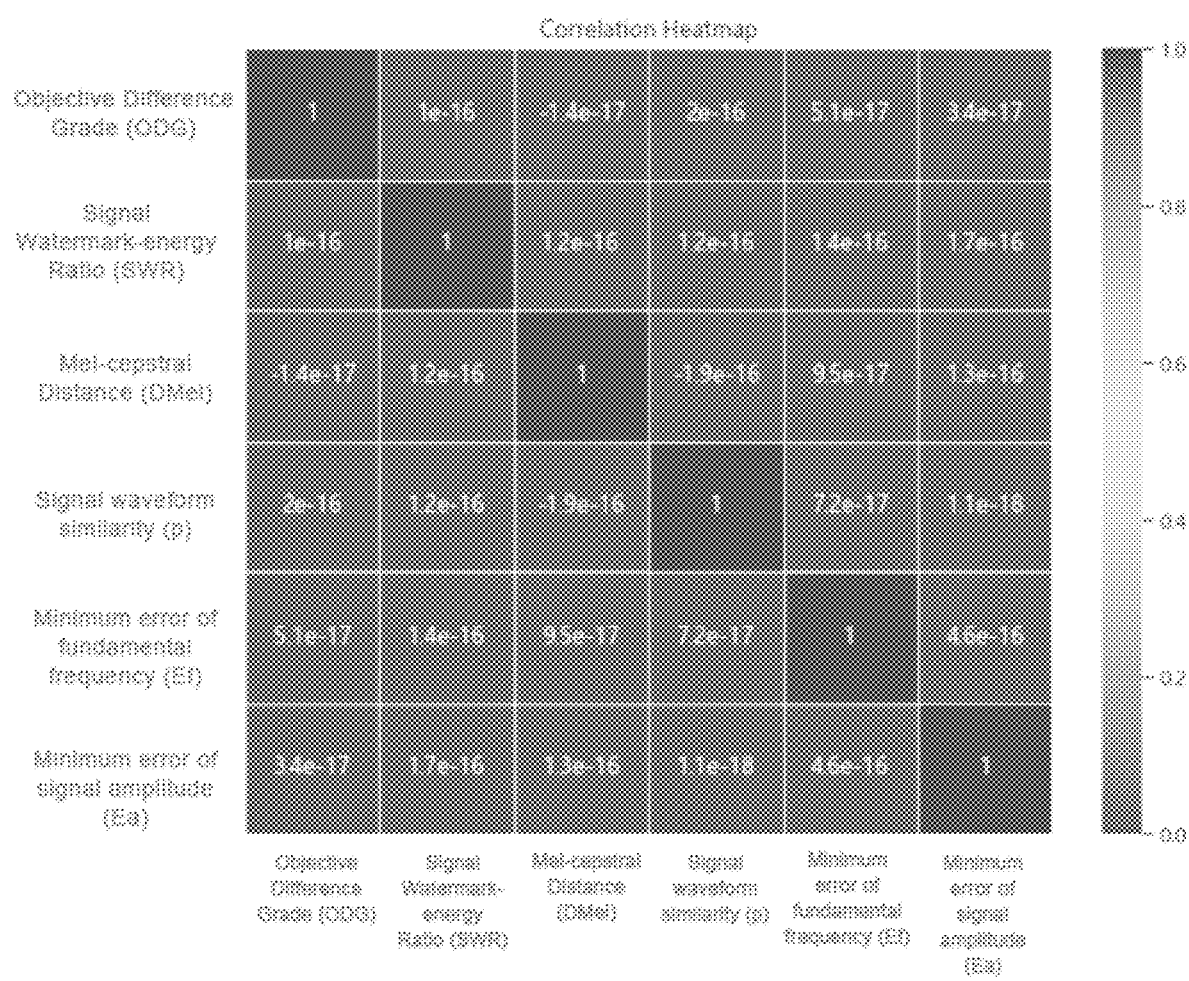
FIG. 2 is a PCA correlation heatmap of the present invention.

The feature screening is performed by calculating PCA linear correlation and cross-correlation degree between the selected features, and for each pair of features with a correlation coefficient greater than 2, one of the features is deleted, and the specific method is as follows:

S2.1. Designing and implementing PCA correlation analysis to calculate the linear correlation between the features, and a PCA formula for calculating the correlation between two features is:

$$\text{cov}(x, y) = \frac{1}{m-1}\sum_{i=1}^{m}(x_i - \bar{x})(y_i - \bar{y}),$$

where x and y respectively represent different features, $\bar{x}$ is a mean of a feature x, $\bar{y}$ is a mean of a feature y, and m represents the number of feature samples; and a resulting correlation heatmap is shown in FIG. 2.

Figure 3:
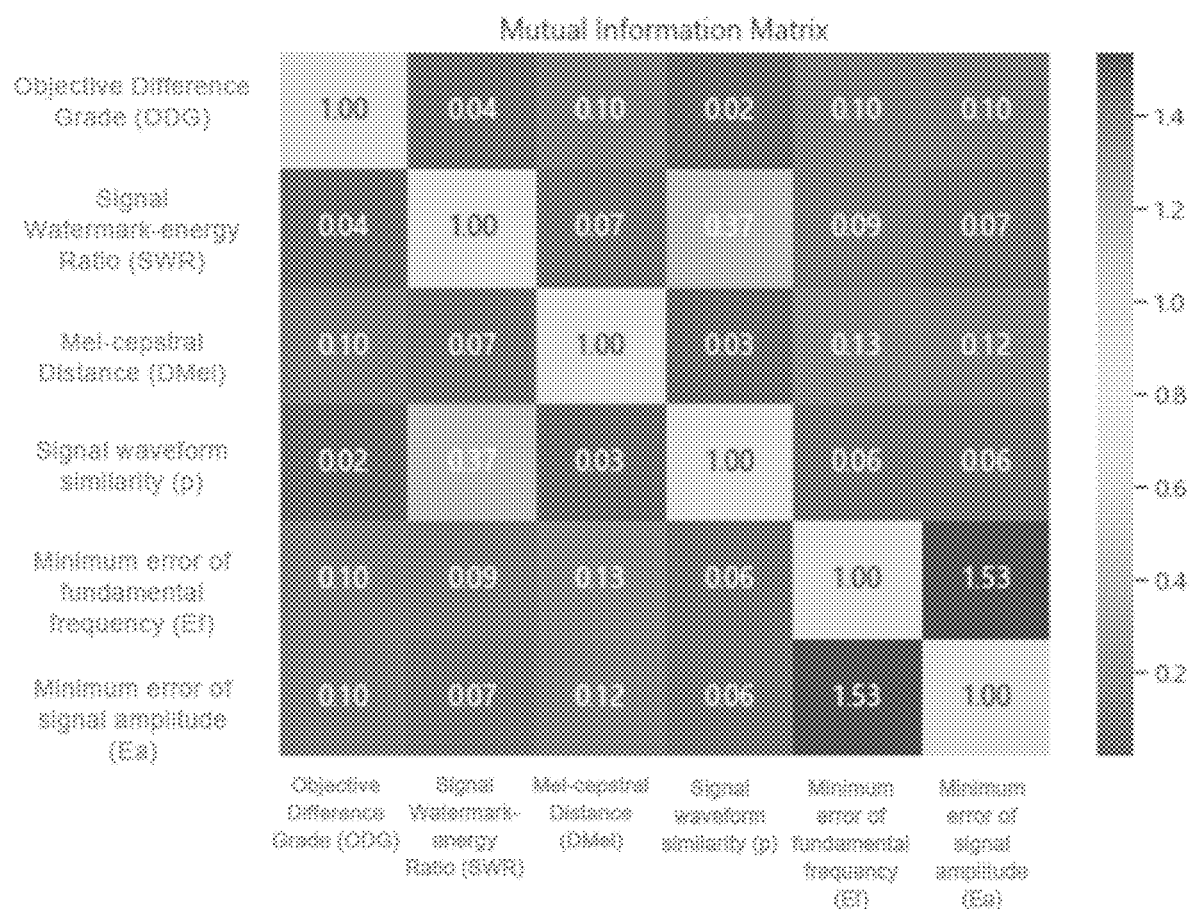
FIG. 3 is a cross-correlation heatmap of the present invention.

S2.2. Designing and implementing mutual information correlation analysis to calculate a non-linear correlation between the features, and for two discrete random variables X and Y, a calculation formula of mutual information MI (X, Y) is:

$$MI(X, Y) = \sum_{x \in X}\sum_{y \in Y}p(x, y)\log\frac{p(x, y)}{p(x) \cdot p(y)},$$

where p(x,y) is a joint probability distribution, and p(x) and p(y) are respective marginal probability distributions; and a resulting correlation heatmap is shown in FIG. 3.

S2.3. Carrying out feature selection, mainly selecting the universal features of various marine mammal sound signals rather than strong correlation features specific to a certain type of marine mammal sound signals, and deleting one of each pair of features with the correlation coefficient greater than 2 according to the calculated PCA linear correlation and the mutual information non-linear correlation, and finally obtaining six features: first audio feature data and second audio feature data, the first audio feature data includes the ODG, the SWR and the DMel, and the second audio feature data includes the signal waveform similarity (ρ), the minimum error of the fundamental frequency (Ef) and the minimum error of the signal amplitude (Ea). A detailed description of the six features is shown in FIG. 4.

S3. Extracting screened six marine mammal sound audio signal features through calculation, specifically including:

S3.1. Designing and implementing an extraction algorithm of an ODG of a feature 1

Performing an ODG test on the sound signal embedded with hidden information to obtain the objective difference grade of the sound signal; the software takes the original sound signal as a reference signal and the bionic signal with the hidden information as a test signal, and the two signals enter a psychoacoustic model simultaneously for calculation, results are subject to feature extraction and synthesis by a perception model to obtain a series of output parameters MOV, and finally, the parameters are mapped as an ODG output by a neural network; when the ODG value is greater than 0 or less than 0, the larger the absolute value, the smaller the difference between the original signal and the bionic signal with the hidden information, the better the imperceptibility and the better the covertness of the bionic signal. A flowchart of an algorithm of the audio quality evaluation software is shown in FIG. 5.

S3.2. Designing and implementing an extraction algorithm of a SWR of a feature 2

The hidden information embedded in the sound signal is regarded as noise, and a numerical value thereof is taken as a degree of influence on the original sound signal, that is, the SWR; the larger the SWR value, the smaller the distortion, and the lower the embedding strength, which indicates that the bionic signal has better covertness. A calculation formula of the signal watermark-energy ratio is:

$$SWR = 10 \cdot \log_{10}\left(\frac{\sum_{n=0}^{L-1}x^2(n)}{\sum_{n=0}^{L-1}(y(n) - x(n))^2}\right);$$

where x(n) represents the original sound signal, y(n) represents the sound signal with the hidden information embedded, L represents a length of the sound signal, and the SWR is in dB.

S3.3. Designing and implementing an extraction algorithm of a signal waveform similarity (ρ) of a feature 3

The signal waveform similarity refers to the difficulty in distinguishing the original signal from the bionic signal with the embedded information in the signal form, that is, the similarity of the two signals in time domain and frequency domain is high, and the similarity of the signals in the time domain and the frequency domain is measured by a correlation coefficient ρ, and a calculation formula is:

$$\rho = \frac{\sum_n s(n)s'(n)}{\sqrt{\sum_n s(n)^2 \cdot \sum_n s'(n)^2}};$$

where s(n) represents an original sound signal segment, s'(n) represents a bionic signal segment with the information embedded, and s'(n)-s(n) is regarded as a desired signal. The closer the ρ value is to 1, the closer the bionic signal is to the original sound signal, and the better the covertness.

S3.4. Designing and implementing extraction algorithm for feature 4 DMel

The Mel-Frequency Cepstral Coefficient (MFCC) is an effective sound representation based on the human auditory system, and a human subjective auditory frequency formula is:

$$F_{mel} = 2595\log_{10}\left(1 + \frac{f}{700}\right) = 1127\ln\left(1 + \frac{f}{700}\right);$$

where $F_{mel}$ is a sensory frequency in Mel, and f is an actual frequency in Hz.

A transfer function of an mth bandpass filter in the human hearing frequency range is defined as $H_m(k)$, where m is the total number of filters in a same bank in the hearing range. If each filter has a triangular filter characteristic with a center frequency $f_m$, and each filter has equal bandwidth on a Mel frequency scale, then the discrete transfer function $H_m(k)$ of each filter is defined as:

$$H_m(k) = \begin{cases} 0 & k < f_{m-1},\ f_{m-1} lek \\ \dfrac{k - f_{m-1}}{f_m - f_{m-1}} & f_{m-1} lek < f_{m-1} \\ \dfrac{f_{m+1} - k}{f_{m+1} - f_m} & f_m lek < f_{m+1} \end{cases} ;$$

The center frequency $f_m$ is defined as:

$$f_m = F_{mel}^{-1}\left(F_{mel}(f_l) + m \dfrac{F_{mel}(f_h) - F_{mel}(f_l)}{M+1}\right);$$

where $f_l$ and $f_h$ are respectively a lower limit frequency and an upper limit frequency of the filter $H_m(k)$. $F_{mel}^{-1}$ is defined as $F_{mel}^{-1}(b) = 700(10^{b/2595}-1) = 700(e^{b/1127}-1)$.

Based on the Mel filter bank, the MFCCs for 1 frame are obtained by:

$$mfcc_i(n) = \sqrt{\dfrac{2}{M}} \sum_{m=0}^{M-1} \log[S_i(m)] \cos\left[\dfrac{\pi n(2m-1)}{2M}\right];$$

where n=1, 2 ... M, $$S_i(m) = \sum_{k=0}^{N-1} |X_i(k)|^2 H_m(k)$$

is an mth Mel filter energy of an ith frame signal. In order to compare the bionic signal with the original signal, the Mel distance di of the ith frame of each sound signal is defined as:

$$d_i = \sqrt{\sum_{n=1}^{M}\left(mfcc_{synthetic}^i(n) - mfcc_{whistle}^i(n)\right)^2} ;$$

a mean Mel distance of all frames of each signal is defined as:

$$D_{Mel} = \dfrac{\sum_{i=1}^{k} d_i}{k};$$

where i=1, 2 ... k.

The smaller the Mel distance, the smaller the difference between the bionic signal and the original signal, and the bionic signal is more likely to be ignored as a marine mammal sound signal, that is, the better the covertness.

S3.5. designing and implementing an extraction algorithm of the minimum error of the fundamental frequency (Ef) of a feature 5 and the minimum error of the signal amplitude (Ea) of a feature 6. Specifically:

Assuming that a time-frequency diagram of the noise-reduced sound signal is $X_m[\omega,m]$, where ω represents frequency, m represents a time period divided by a window function $w[\omega]$, and $X_m[\omega]$ represents a Fourier transform result of a mth time period. f(m) represents a fundamental frequency of the mth time period, and an expression using a maximum value extraction method is as follows:

$$f(m) = \mathrm{argmax}|X_m[\omega]|;$$

The fundamental frequency of each time period of the sound signal without and with the information embedded is calculated respectively, and the minimum error of the fundamental frequency of all time periods is taken, and a calculation formula is as follows:

$$\Delta v = \dfrac{\sum_{m=1}^{n}|(f_T(m) - f_L(m))|}{n};$$

where n represents the number of time periods taken, $f_T(m)$ represents the fundamental frequency of the mth time period of the original sound signal, and $f_L(m)$ represents the fundamental frequency of the mth time period of the sound signal with the information embedded.

An energy $e_r(m)$ of a mth data block of a rth harmonic is obtained using a short-time Fourier transform with a window length L, and a formula thereof is as follows:

$$e_r(m) = X_m[f_r(m)];$$

Let amplitude of a first sampling point of each data block be $a_r[m1]$, and a formula thereof is as follows:

$$a_r[m_1] = 2\sqrt{e_r[m]}/L;$$

A value of each sampling point of the data block is obtained using an interpolation method, and finally an amplitude value $a_r[n]$ of the rth harmonic at each sampling point is obtained. A mean amplitude error of all sampling points in each harmonic of the sound signal without and with the information embedded is calculated as follows:

$$\Delta a_r = \dfrac{\sum_{i=1}^{n}|a_r^T[i] - a_r^L[i]|}{n};$$

where $a_r^T[i]$ represents an amplitude value of an ith sampling point of the rth harmonic of the original sound signal, $a_r^L[i]$ represents the amplitude value of the ith sampling point of the rth harmonic of the sound signal with the information embedded, n represents the number of sampling points, and finally the minimum error of the signal amplitude is calculated, which is defined as the minimum error of the mean amplitude error of all harmonics, and a calculation formula thereof is as follows:

$$\Delta x = \frac{\sum_{r=1}^{m} \Delta a_r}{m};$$

where m represents the number of harmonics, and $\Delta a_r$ represents the mean amplitude error of the rth harmonic.

S4 Feature data normalization: normalization processing is performed on the extracted six audio signal features of the universal features to obtain normalized audio features. Specifically:

A mean and a standard deviation of all data of each feature are calculated, and then the data is subject to normalization processing; normalization is a data preprocessing technique that subtracts the mean from each data point and then divides a result by the standard deviation to map the data to a normalized distribution with a mean of 0 and a standard deviation of 1, and a normalization formula is as follows:

normalized_data=(data−means)/stds.

S5. Calculating importance and correlation of the audio signal features: calculating feature importance of the obtained six audio signal features through a random forest, and calculating feature correlation of the obtained six audio signal features using a Pearson correlation coefficient. Specifically:

The importance of the six features obtained above is calculated through the random forest, and the obtained feature importance score is normalized in the random forest to ensure that the sum of the scores of all the features is 1. The resulting importance of the six features is shown in FIG. 6.

The correlation of the six features obtained above is calculated using a Pearson correlation coefficient formula. A calculation formula of the Pearson correlation coefficient is as follows:

$$r = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}};$$

when the correlation coefficient r>0, the feature is positively correlated with a similarity score, and when the correlation coefficient r<0, the feature is negatively correlated with the similarity score. The resulting correlation of the six features is shown in FIG. 7.

S6. Obtaining weight coefficient formulas of the six audio features: finally, establishing a prediction model using linear regression and ridge regression to obtain the weight coefficient formulas of the six audio features, specifically:

S6.1. Calculating a weight coefficient formula using a linear regression method

A regression algorithm for a prediction model is established using linear regression to find a linear function suitable for the data, and a calculation formula of the weight coefficient of the linear regression is:

$$\omega = (X^T X)^{-1} X^T y;$$

where X is an m×n matrix, each row represents a sample, each column represents a feature, and y is an m-dimensional vector representing a target variable.

The weight coefficient formula obtained by the linear regression is as follows:

$$y = 79.2544 + 0.7234 * x_1 + 0.2803 * x_3 +$$
$$(-3.3106) * x_4 + 0.6653 * x_4 + (-10.0353) * x_5 + 7.6626 * x_6;$$

S6.2. calculating a weight coefficient formula using a ridge regression method

A regression algorithm for the prediction model is established using ridge regression to find a linear function suitable for the data, and a calculation formula of the weight coefficient of the ridge regression is:

$$\omega_{ridge} = (X^T X + \lambda I)^{-1} X^T y;$$

where $\omega_{ridge}$ is a weight vector of the ridge regression, $\lambda$ is a regularization parameter, I is an identity matrix, and the regularization parameter $\lambda$ controls the intensity of regularization.

The weight coefficient formulas obtained by the ridge regression is as follows:

$$y = 79.2544 + 0.7138 * x_1 + 0.2723 * x_3 +$$
$$(-3.3078) * x_4 + 0.6675 * x_4 + (-9.4801) * x_5 + 7.0694 * x_6.$$

S7. calculating a covertness score of the imitated marine mammal sound signal through the weight coefficient formulas of the features obtained by S6; and substituting all the values of the six features into the obtained weight coefficient formulas to calculate a score of the bionic audio signal, as shown in FIG. 8.

The above-mentioned embodiments are merely illustrative of the technical solutions of the present invention, and do not limit the same. Although the present invention has been described in detail with reference to the foregoing embodiments, those skilled in the art will appreciate that the technical solutions disclosed in the above-mentioned embodiments can still be modified or some or all of the technical features can be replaced by equivalents, and such modifications and replacements do not depart from the spirit and scope of the technical solutions claimed by the present invention.

What is claimed is:

1. A computerized covertness scoring method extracting universal features of imitated marine mammal sound signals, the method being implemented using an underwater acoustic communication device and being used to intuitively describe similarity difference between a plurality of simulated marine mammal sound signals embedded with communication information generated by the underwater acoustic communication device and real marine mammal sounds, thus obtaining a covertness score of each simulated marine mammal sound signal generated by the underwater acoustic communication device, that is, the higher the similarity, the higher the covertness score, the method comprising the following steps:

S1. audio preprocessing: performing audio preprocessing on an input real audio data set- and an imitated audio data set from the perspective of human hearing and signal waveform to obtain preprocessed audio data sets, wherein the real audio data set is composed of real marine mammal sound signals, and the imitated audio data set is composed of the simulated marine mammal sound signals embedded with communication information generated by the underwater acoustic communication device;

S2. feature screening for universal audio features: performing feature screening on the real audio data set and the imitated to select universal features therefrom, the universal features comprising a first audio feature evaluated and analyzed from the perspective of human hearing and a second audio feature evaluated and analyzed from the perspective of signal processing; the first audio feature comprising an objective difference grade, a signal watermark-energy ratio and a Mel-cepstral distance, and the second audio feature comprising a signal waveform similarity, a minimum error of a fundamental frequency and a minimum error of a signal amplitude;

S3. extracting screened six marine mammal sound audio signal features through calculation, specifically comprising:

S3.1. designing and implementing an extraction algorithm of an objective difference grade of a feature 1;

S3.2. designing and implementing an extraction algorithm of a signal watermark-energy ratio of a feature 2;

S3.3. designing and implementing an extraction algorithm of a signal waveform similarity of a feature 3;

S3.4. designing and implementing an extraction algorithm of a Mel-cepstral distance of a feature 4; and S3.5. designing and implementing an extraction algorithm of the minimum error of the fundamental frequency of a feature 5 and the minimum error of the signal amplitude of a feature 6;

S4. feature data normalization: performing normalization processing on the six audio signal features of the universal features extracted in step S3 to obtain normalized audio features;

S5. calculating importance and correlation of the audio signal features: calculating feature importance of the six audio signal features through a random forest obtained in step S4, and calculating feature correlation of the obtained six audio signal features using a Pearson correlation coefficient;

S6. obtaining weight coefficient formulas of the six audio features: finally, establishing a prediction model using linear regression and ridge regression to obtain the weight coefficient formulas of the six audio features; and S7. calculating the covertness score of each of the imitated marine mammal sound signals generated by the underwater acoustic communication device through the weight coefficient formulas of the features obtained in step S6.

2. The computerized covertness scoring method for extracting universal features of imitated marine mammal sound signals according to claim 1, wherein a specific method of the audio preprocessing in step S1 is as follows: performing noise reduction, sound enhancement, echo cancellation and de-clicking operations on the audio data set of the original marine mammal sound and the audio data set of the imitated marine mammal sound, and then the audio signals are digitally processed to improve quality, accuracy and applicability of the audio signals.

3. The computerized covertness scoring method for extracting universal features of imitated marine mammal sound signals according to claim 2, wherein in step S2, the feature screening is performed by calculating Principal Component Analysis (PCA) linear correlation and cross-correlation degree between the selected features, and for each pair of features with a correlation coefficient greater than 2, one of the features is deleted, and the specific method is as follows:

S2.1. designing and implementing PCA correlation analysis to calculate the linear correlation between the features, and a PCA formula for calculating the correlation between two features is:

$$\text{cov}(x, y) = \frac{1}{m-1} \sum_{i=1}^{m} (x_i - \bar{x})(y_i - \bar{y}),$$

where x and y respectively represent different features, $\bar{x}$ is a mean of a feature x, $\bar{y}$ is a mean of a feature y, and m represents the number of feature samples;

S2.2. designing and implementing mutual information correlation analysis to calculate a non-linear correlation between the features, and for two discrete random variables X and Y, a calculation formula of mutual information MI (X, Y) is:

$$MI(X, Y) = \sum_{x \in X} \sum_{y \in Y} p(x, y) \log \frac{p(x, y)}{p(x) \cdot p(y)},$$

where p(x,y) is a joint probability distribution, and p(x) and p(y) are respective marginal probability distributions; and S2.3. carrying out feature selection, mainly selecting the universal features of various marine mammal sound signals rather than strong correlation features specific to a certain type of marine mammal sound signals, and deleting one of each pair of features with the correlation coefficient greater than 2 according to the calculated PCA linear correlation and the mutual information non-linear correlation, and finally obtaining six features: first audio feature data and second audio feature data, the first audio feature data comprises the objective difference grade, the signal watermark-energy ratio and the Mel-cepstral distance, and the second audio feature data comprises the signal waveform similarity, the minimum error of the fundamental frequency and the minimum error of the signal amplitude.

4. The computerized covertness scoring method for extracting universal features of imitated marine mammal sound signals according to claim 1, wherein step S3.1 is specifically as follows:

Performing an Objective Difference Grade (ODG) test on the sound signal embedded with hidden information to obtain the objective difference grade of the sound signal; the software takes the original sound signal as a reference signal and the bionic signal with the hidden information as a test signal, and the two signals enter a psychoacoustic model simultaneously for calculation, results are subject to feature extraction and synthesis by a perception model to obtain a series of output parameters Model Output Variable (MOV), and finally, the parameters are mapped as an ODG output by a neural network; when the ODG value is greater than 0 or less than 0, the larger the absolute value, the smaller the difference between the original signal and the bionic signal with the hidden information, the better the imperceptibility and the better the covertness of the bionic signal.

5. The computerized covertness scoring method for extracting universal features of imitated marine mammal sound signals according to claim 1, wherein step S3.2 is specifically as follows:

the hidden information embedded in the sound signal is regarded as noise, and a numerical value thereof is taken as a degree of influence on the original sound signal, that is, the Signal Watermark-energy Ratio (SWR); the larger the SWR value, the smaller the distortion, and the lower the embedding strength, which indicates that the bionic signal has better covertness, and a calculation formula of the signal watermark-energy ratio is:

$$SWR = 10 \cdot \log_{10}\left(\frac{\sum_{n=0}^{L-1} x^2(n)}{\sum_{n=0}^{L-1}(y(n)-x(n))^2}\right);$$

where x(n) represents the original sound signal, y(n) represents the sound signal with the hidden information embedded, L represents a length of the sound signal, and the SWR is in dB.

6. The computerized covertness scoring method for extracting universal features of imitated marine mammal sound signals according to claim 1, wherein step S3.3 is specifically as follows:

the signal waveform similarity refers to the difficulty in distinguishing the original signal from the bionic signal with the embedded information in the signal form, that is, the similarity of the two signals in time domain and frequency domain is high, and the similarity of the signals in the time domain and the frequency domain is measured by a correlation coefficient ρ, and a calculation formula is:

$$\rho = \frac{\sum_n s(n)s'(n)}{\sqrt{\sum_n s(n)^2 \cdot \sum_n s'(n)^2}};$$

where s(n) represents an original sound signal segment, s'(n) represents a bionic signal segment with the information embedded, and s'(n)-s(n) is regarded as a desired signal; the closer the ρ value is to 1, the closer the bionic signal is to the original sound signal, and the better the covertness.

7. The computerized covertness scoring method for extracting universal features of imitated marine mammal sound signals according to claim 1, wherein step S3.4 is specifically as follows:

the Mel-Frequency Cepstral Coefficient (MFCC) is an effective sound representation based on the human auditory system, and a human subjective auditory frequency formula is:

$$F_{mel} = 2595\log_{10}\left(1+\frac{f}{700}\right) = 1127\ln\left(1+\frac{f}{700}\right);$$

where Fmel is a sensory frequency in Mel, and f is an actual frequency in Hz;

a transfer function of an mth bandpass filter in the human hearing frequency range is defined as $H_m(k)$, where m is the total number of filters in a same bank in the hearing range; if each filter has a triangular filter characteristic with a center frequency $f_m$, and each filter has equal bandwidth on a Mel frequency scale, then the discrete transfer function $H_m(k)$ of each filter is defined as:

$$H_m(k) = \begin{cases} 0 & k < f_{m-1}, f_{m-1} lek \\ \frac{k-f_{m-1}}{f_m-f_{m-1}} & f_{m-1} lek < f_{m-1} \\ \frac{f_{m+1}-k}{f_{m+1}-f_m} & f_m lek < f_{m+1} \end{cases};$$

the center frequency $f_m$ is defined as:

$$f_m = F_{mel}^{-1}\left(F_{mel}(f_l) + m\frac{F_{mel}(f_h) - F_{mel}(f_l)}{M+1}\right);$$

where $f_l$ and $f_h$ are respectively a lower limit frequency and an upper limit frequency of the filter $H_m(k)$, and $F_{mel}^{-1}$ is defined as $F_{mel}^{-1}(b) = 700(10^{b/2595}-1) = 700(e^{b/1127}-1)$;

based on the Mel filter bank, the MFCCs for 1 frame are obtained by:

$$mfcc_i(n) = \sqrt{\frac{2}{M}} \sum_{m=0}^{M-1} \log[S_i(m)]\cos\left[\frac{\pi n(2m-1)}{2M}\right];$$

where n=1, 2 ... M, $$S_i(m) = \sum_{k=0}^{N-1} |X_i(k)|^2 H_m(k)$$

is an mth Mel filter energy of an ith frame signal; in order to compare the bionic signal with the original signal, the Mel distance di of the ith frame of each sound signal is defined as:

$$d_i = \sqrt{\sum_{n=1}^{M}\left(mfcc_{synthetic}^i(n) - mfcc_{whistle}^i(n)\right)^2};$$

a mean Mel distance of all frames of each signal is defined as:

$$D_{Mel} = \frac{\sum_{i=1}^{k} d_i}{k};$$

where i=1, 2 ... k;

the smaller the Mel distance, the smaller the difference between the bionic signal and the original signal, and the bionic signal is more likely to be ignored as a marine mammal sound signal, that is, the better the covertness.

8. The computerized covertness scoring method for extracting universal features of imitated marine mammal sound signals according to claim 1, wherein step S3.5 is specifically as follows:

assuming that a time-frequency diagram of the noise-reduced sound signal is $X_m[\omega,m]$, where $\omega$ represents frequency, m represents a time period divided by a window function $w[\omega]$, and $X_m[\omega]$ represents a Fourier transform result of a mth time period; and f(m) represents a fundamental frequency of the mth time period, and an expression using a maximum value extraction method is as follows:

$$f(m) = \mathrm{argmax}|X_m[\omega]|;$$

the fundamental frequency of each time period of the sound signal without and with the information embedded is calculated respectively, and the minimum error of the fundamental frequency of all time periods is taken, and a calculation formula is as follows:

$$\Delta v = \frac{\sum_{m=1}^{n} |(f_T(m) - f_L(m))|}{n};$$

where n represents the number of time periods taken, $f_T(m)$ represents the fundamental frequency of the mth time period of the original sound signal, and $f_L(m)$ represents the fundamental frequency of the mth time period of the sound signal with the information embedded;

an energy $e_r(m)$ of a mth data block of a rth harmonic is obtained using a short-time Fourier transform with a window length L, and a formula thereof is as follows:

$$e_r(m) = X_m[f_r(m)];$$

let amplitude of a first sampling point of each data block be ar[m1], and a formula thereof is as follows:

$$a_r[m_1] = 2\sqrt{e_r[m]}/L;$$

a value of each sampling point of the data block is obtained using an interpolation method, and finally an amplitude value $a_r[n]$ of the rth harmonic at each sampling point is obtained; and a mean amplitude error of all sampling points in each harmonic of the sound signal without and with the information embedded is calculated as follows:

$$\Delta a_r = \frac{\sum_{i=1}^{n} |a_r^T[i] - a_r^L[i]|}{n};$$

where $a_r^T[i]$ represents an amplitude value of an ith sampling point of the rth harmonic of the original sound signal, $a_r^L[i]$ represents the amplitude value of the ith sampling point of the rth harmonic of the sound signal with the information embedded, n represents the number of sampling points, and finally the minimum error of the signal amplitude is calculated, which is defined as the minimum error of the mean amplitude error of all harmonics, and a calculation formula thereof is as follows:

$$\Delta x = \frac{\sum_{r=1}^{m} \Delta a_r}{m};$$

where m represents the number of harmonics, and $\Delta a_r$ represents the mean amplitude error of the rth harmonic.

9. The computerized covertness scoring method for extracting universal features of imitated marine mammal sound signals according to claim 1, wherein step S4 is specifically as follows:

a mean and a standard deviation of all data of each feature are calculated, and then the data is normalized; normalization is a data preprocessing technique that subtracts the mean from each data point and then divides a result by the standard deviation to map the data to a normalized distribution with a mean of 0 and a standard deviation of 1, and a normalization formula is as follows:

normalized_data=(data−means)/stds;

step S5 is specifically as follows:
the importance of the six features obtained above is calculated through the random forest, and the obtained feature importance score is normalized in the random forest to ensure that the sum of the scores of all the features is 1;

the correlation of the six features obtained above is calculated using a Pearson correlation coefficient formula, and a calculation formula of the Pearson correlation coefficient is as follows:

$$r = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}};$$

when the correlation coefficient r>0, the feature is positively correlated with a similarity score, and when the correlation coefficient r<0, the feature is negatively correlated with the similarity score.

* * * * *